Jan. 11, 1949.　　　　J. E. SOCKE　　　　2,458,538
METHOD OF CUTTING BLANKS
Filed April 13, 1945　　　　　　　　　　5 Sheets-Sheet 1
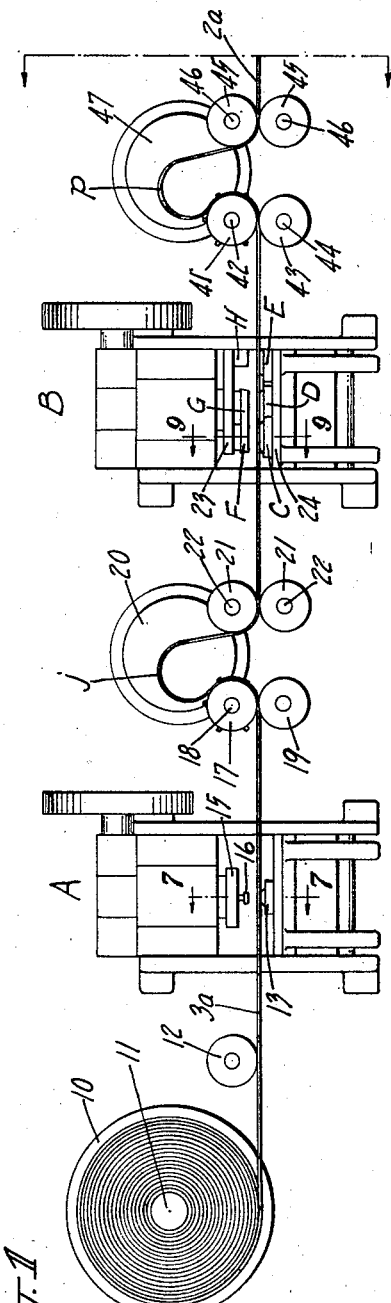
INVENTOR.
John E. Socke
BY Ivan D. Thornburgh
Charles H. Erve
ATTORNEYS

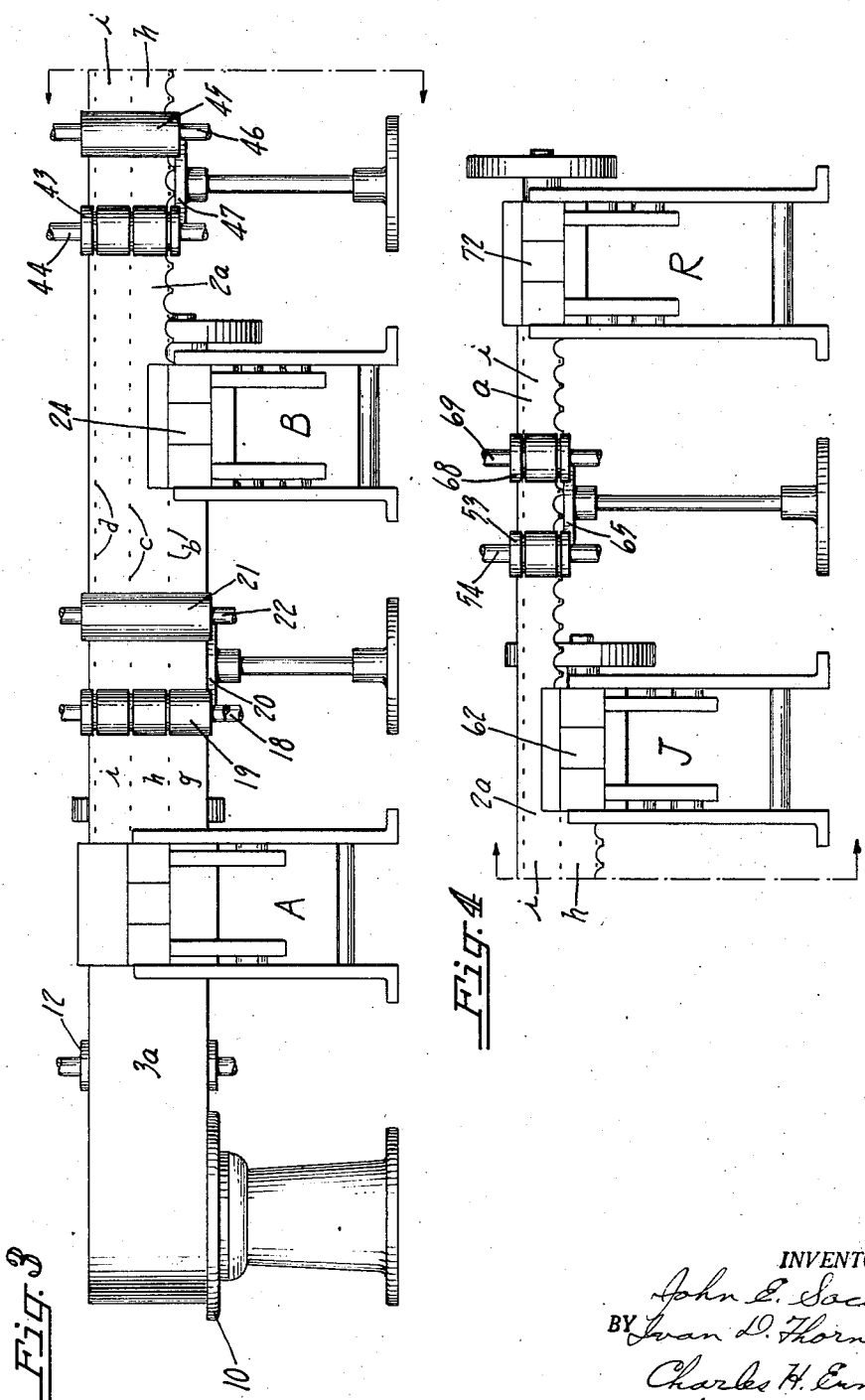

Jan. 11, 1949.  J. E. SOCKE  2,458,538
METHOD OF CUTTING BLANKS
Filed April 13, 1945  5 Sheets-Sheet 3
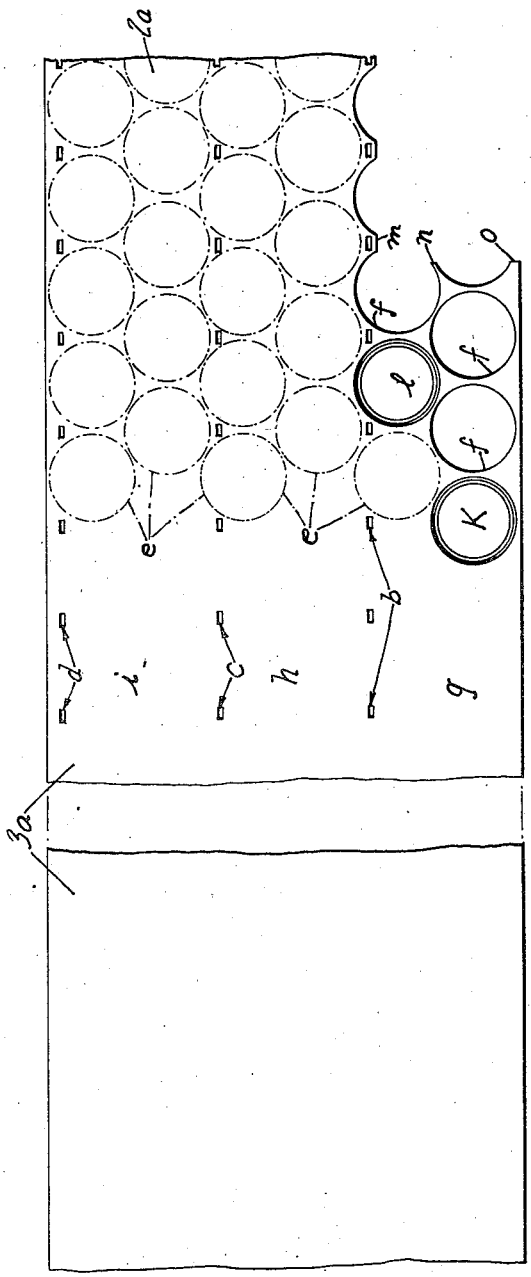
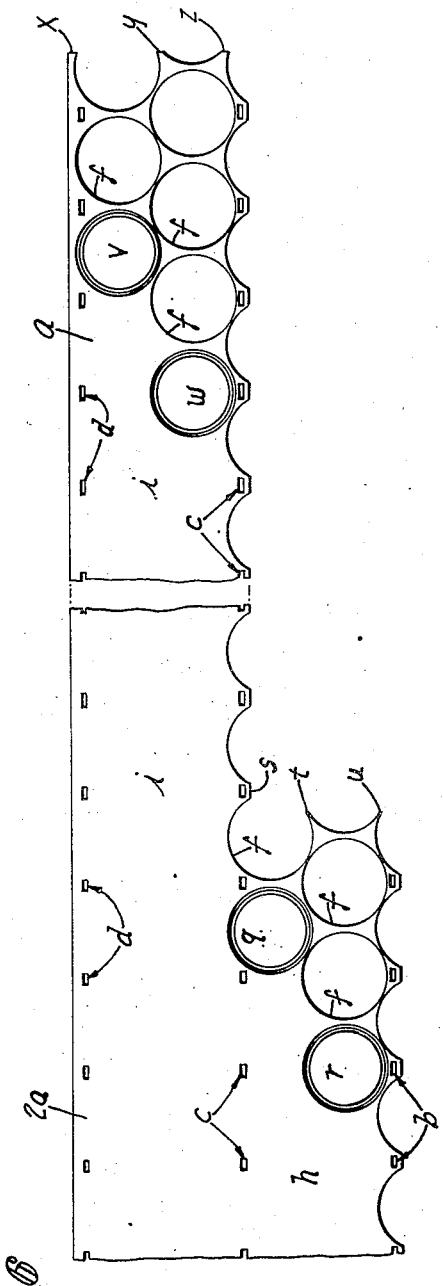
INVENTOR.
John E. Socke
BY Ivan D. Thornburgh
Charles H. Erne
ATTORNEYS Jan. 11, 1949.     J. E. SOCKE     2,458,538
METHOD OF CUTTING BLANKS
Filed April 13, 1945     5 Sheets-Sheet 4
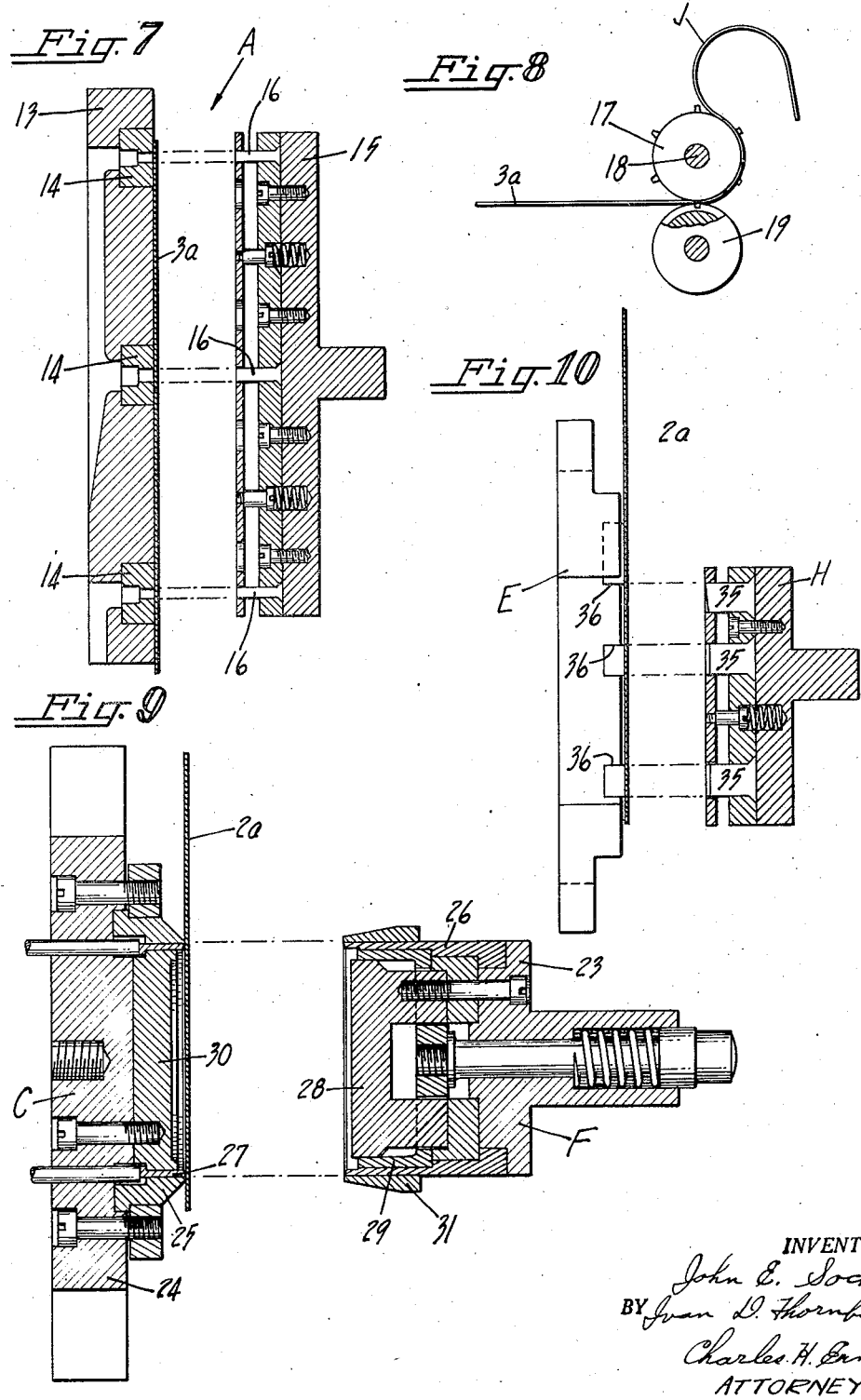
INVENTOR.
John E. Socke
BY Ivan D. Thornburgh
Charles H. Erne
ATTORNEYS Jan. 11, 1949. J. E. SOCKE 2,458,538
METHOD OF CUTTING BLANKS
Filed April 13, 1945 5 Sheets-Sheet 5
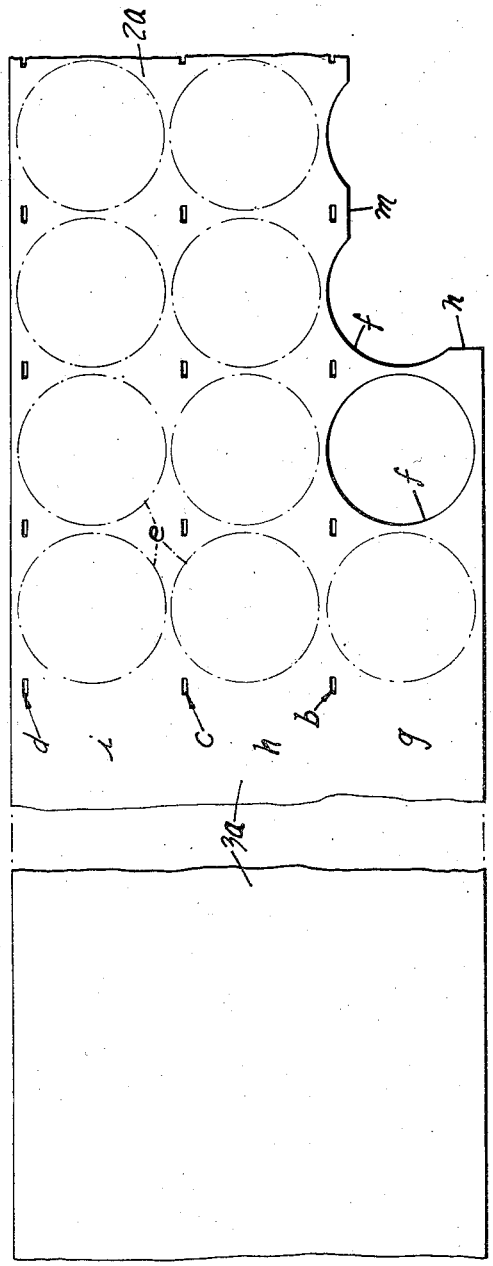
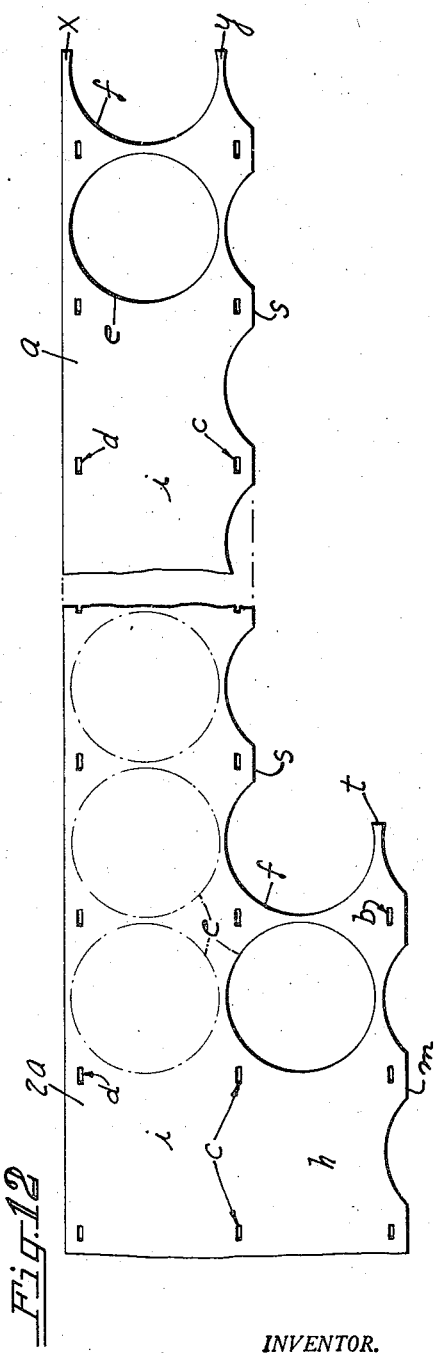
INVENTOR.
John E. Socke
BY Ivan D. Thornburgh
Charles H. Erne
ATTORNEYS Patented Jan. 11, 1949

2,458,538

UNITED STATES PATENT OFFICE 2,458,538

METHOD OF CUTTING BLANKS

John E. Socke, Pelham Manor, N. Y., assignor to American Can Company, New York, N. Y., a corporation of New Jersey Application April 13, 1945, Serial No. 588,083

12 Claims. (Cl. 164—18)

The present invention relates to a method of cutting blanks from strips of sheet material containing a plurality of parallel rows of potential blank spaces and has particular reference to cutting of the blanks from certain rows of spaces in the strip which is advanced and held in exact cutting positions by engagement of suitable feeding devices in feeding and gauging recesses or perforations formed or cut in rows in the strip, the manner of cutting making use of such perforations for the feeding and gauging of the strip until all of the blank spaces have been removed.

An object of the invention is the provision of a method of cutting blanks from a strip containing rows of potential blank spaces and includes advancing the strip for cutting by utilizing a plurality of spaced openings such as recesses or perforations in such a manner as to insure there being at least one row of recesses or perforations for the handling of the strip in the final blank cutting.

Another object of the invention is the provision of a method of forming rows of gauging and feeding recesses or perforations in a strip of sheet material containing parallel rows of potential blank spaces and of advancing the strip by engagement in the perforations, the cutting of the blanks being made from certain rows in certain stations and along certain sections in the strip while blanks from other rows are cut at other stations.

Still another object is the provision of a method of cutting strips of the character described wherein scrap, formed by the removal of blanks from a certain row, is severed from the strip thus changing the strip to a width which is less than its original width, and each blank cutting and each scrap severing operation being repeated on the succeeding rows until the blank is entirely cut away, the strip being properly gauged for each cutting following each feeding action as long as there remains any part of the strip to be cut.

A further object of the invention is the provision of such a method of cutting blanks from a strip wherein the strip is fed and is held in a vertical position so that the blanks as cut may be easier handled and so that scrap severed from the strip falls off, thus leaving a narrower strip at each removal of a blank.

Numerous other objects and advantages of the invention will be apparent as it is better understood from the following description, which, taken in connection with the accompanying drawings, discloses a preferred embodiment thereof.

Referring to the drawings:

Figure 1 is a plan view of one section of a line of machinery adapted for carrying out the method steps of the present invention, this machinery being shown diagrammatically;

Fig. 2 is a continuation of Fig. 1 and shows the remaining section;

Fig. 3 is a schematic view in elevation of that part of the line of machines illustrated in Fig. 1;

Fig. 4 is a continuation of the line being an elevation of the machine line of Fig. 2, the two views Figs. 3 and 4 showing how the strip gets narrower with each double blank cutting;

Figs. 5 and 6 considered together constitute a diagrammatic strip stagger cutting layout, being face views of a strip of sheet material containing a plurality of double rows of spaces for circular blanks, parts being broken away, the combined views graphically indicating the results of double cutting of double blank rows in the strip and also indicating the results of scrap cutting as to that double row;

Fig. 7 is an enlarged vertical sectional detail of a perforating punch and die mechanism, as indicated by the section line 7—7 in Fig. 1;

Fig. 8 is a sectional detail of a feeding and gauging sprocket which is used at various positions in the line for advancing the work or strip through the various operations;

Fig. 9 is an enlarged vertical sectional view of a typical blank cutting punch and die mechanism for punching out blanks from the strip taken along the line 9—9 in Fig. 1;

Fig. 10 is an enlarged vertical sectional detail of a punch and die scrap trimming mechanism as viewed along the section line 10—10 in Fig. 2; and Figs. 11 and 12 are diagrammatic views similar to Figs. 5 and 6 respectively but illustrating a different layout and showing a single row blank cutting.

In high speed production for the manufacture of blanks such for example as can ends it is desirable to utilize a strip of stock containing a plurality of rows of potential blank spaces. These blank spaces for the most economical use of the area contained in the strip when the blanking line is circular, oval, etc., may be arranged in a so-called "staggered layout" although the invention is not confined to such a cutting layout.

It is also desirable for economy of machine units in high speed cutting as in can manufacture of can ends of circular outline for example, to utilize a double row of potential blank spaces as a cutting unit. With this in mind a staggered double row cutting of the strip will be described in some detail but it will be understood that the term "double row" is to be used in a relative sense only. In some instances, as in the cutting of large size can ends for example, a single row will constitute the cutting unit. This is also illustrated and will be explained fully.

The present invention contemplates the cutting of blanks from certain rows at one station and then further advancing the cut strip to other stations for the removal of blanks from other rows. Provision is also made for removing scrap formed by the cutting of blanks in the first station with the result that the strip becomes narrower as it is advanced further into other stations.

It is a feature of the present invention to provide for the accurate gauging as well as the accurate feeding of the strip through the various cutting stations. The strip first may be perforated and rewound as a completed part of providing a strip prior to blanking but again the perforating step may constitute one of the method steps herein described and claimed.

In any event at the beginning of operations a relatively wide strip containing a number of rows of potential blank spaces is blanked along a unit row of the strip at the first operating station. After blanks have been removed from this single or double row of potential blank spaces and after the corresponding scrap has been removed, the resulting narrower strip is subjected to the next blanking operation at a second station. This is repeated on successive rows as the strip becomes narrower. It may be mentioned that the severing of scrap at the various operating stations will in certain instances result in the removal of some of the rows of gauging and feeding perforations. However, provision is made for the utilization of at least one row of perforations for the final cutting.

In the cutting of circular, oval or other non-rectangular shaped blanks from a strip, the most economical layout includes a stagger arrangement of blank spaces in adjacent rows. There is some advantage, for many purposes, of the layout including two blanks, one from each row, which thus may be simultaneously cut from a double row in the strip. Such a layout will be used in the following detailed description which is exemplary of the preferred steps of procedure in the present invention.

Accordingly reference first should be had to Figs. 5 and 6 which show a strip in width sufficient to accommodate one or more double rows of potential blank spaces as stock. This is the preferred layout. In this particular embodiment a staggered layout is shown from which circular blanks are to be cut, and a double row of blank spaces constitutes the row unit. In this layout the strip originally contains blank spaces for three double rows or a total of six single rows.

Before proceeding with the detailed description, mention may be made of another form of layout as shown in Figs. 11 and 12. In such a layout the individual potential blank spaces are in parallel rows but there is no staggering of the rows. Transversely of the strip the rows extend along rectangular lines. In this instance a single row of blank spaces constitutes the cutting unit.

Such a strip like the strip shown in Figs. 5 and 6 is presented to various blanking and scrap cutting stations and the strip becomes narrower upon passing through each station. The gauging and feeding as by use of rows of perforations is the same as in the preferred layout and reference as to further details will be delayed until further explanation is had of the strip of Figs. 5 and 6.

The strip irrespective of the layout used is first perforated with a series of gauging and feeding perforations. There may be a row of perforations for each single or each double row of blank spaces. Instead of perforations pressed-in recesses may be used in the same manner. The word "openings" is used herein to cover both of the described perforations and recesses. The forming of the perforations may constitute a part of an organized manufacturing line and this procedure is illustrated and described hereinafter. As already mentioned, however, the gauging and feeding perforations may be formed in the strip as a separate operation if desired, in which event the perforated strip will be wound into reel form for storage.

Referring first to the cutting layout of Figs. 5 and 6, a strip of material $3a$ first is blank or without perforations but undergoes a change as the work is subjected to various operations. First the strip is provided with a lower row of perforations $b$, an adjacent intermediate row $c$ and an upper row $d$. Parts of the blank spaces from which can ends may be cut are suggested by circular dot and dash lines $e$ arranged, in the embodiment now being considered, in staggered relation. When a can end blank as one example is cut out, the cut edge periphery of the same designated by the letter $f$ will be cut from the strip along the proper row.

In this layout there is a double row $g$ of blank spaces extending along the bottom edge of the strip. Above this is an intermediate double row $h$ of blank spaces and an upper double row $i$ of blank spaces. Thus in the layout disclosed in Figs. 5 and 6 and also indicated in certain other figures, six single rows of can end blanks will be removed from the strip along the cutting lines $f$ therein when all of the cutting operations are completed. The scrap produced by cutting preferably is removed as it is formed.

A greater or lesser number of double row spaces can be used if desired, the three double rows shown in the present example embodying the proper stock for all of the necessary steps to carry out the present invention. The number of cutting operations required will depend on the number of rows or spaces. This will be more readily understood as the description proceeds.

It is desirable to feed the strip $3a$ through the various cutting operations with the strip disposed substantially in a vertical position at all times. Perforating and cutting die mechanism as well as scrap trimming devices will operate, therefore, in substantially a horizontal plane. Accordingly the strip $3a$ is fed through the various steps of operation with the double row $i$ at the top. The intermediate double row $h$ in the middle at the beginning of the feeding strip, will become the bottom of a narrowed strip $2a$ when the bottom row $g$ is removed. Finally the strip $2a$ will be reduced in width to the top double blank row $i$ when it will be referred to as a strip $a$. Before more fully explaining this blank space positioning a description of the machines used in the manufacturing line will be given.

The strip of material $3a$ (Fig. 1) is supplied to the manufacturing line from a reel 10. Such a reel may be mounted upon a spindle 11 supported in suitable manner in a vertical position. It is from this spindle 11 that the strip stock $3a$ is pulled from the reel 10 by the various feeding devices to be described. The first machine in the manufacturing line is a perforating press mechanism A. The strip stock is fed from the supply reel 10 over a guiding pulley 12 and directly into this first machine. This press mechanism A is used to punch out small areas to produce the rows of perforations b, c and d in the strip 3a and to prepare it for accurate feeding through the various succeeding individual machines in the manufacturing line.

The perforating mechanism A comprises a stationary die member 13 for supporting inserted cutting dies 14 (Fig. 7) and a movable punch block 15. The punch block carries three perforating punches 16 which enter cooperating openings in the dies 14 and, during a rest period in the intermittent advancement of the strip, cut out a vertically aligned series of perforations in the rows of perforations b, c and d.

If recesses were substituted for the perforations b, c and d the die parts 14 and 16 would be shaped correspondingly. Such changed die parts would then emboss the proper portions of the strip instead of cutting through the stock.

The strip 3a is drawn into the press and is unwound from the reel 10 by a feed sprocket 17 (Figs. 1 and 8). This sprocket is located just beyond the perforating press A and being in such position engages the perforated part of the strip. This insures accurate feeding and holding of the strip.

Sprocket 17 is mounted upon an intermittently rotatable drive shaft 18. Shaft 18 is journaled in suitable frame parts and is operated in any suitable manner to provide the necessary step advancement of the strip. Sprocket 17 is wide enough to extend the full width or height of the strip 3a and carries three rows or decks of aligned teeth to engage in the three respective rows of perforations b, c and d. A grooved pressure roller 19 cooperates with the sprocket 17 and holds the strip against the sprocket so that the teeth of the sprocket will properly engage in the perforations. Roller 19 is mounted upon a vertically disposed spindle which if desired may be rotated in unison with the drive shaft 18.

Each intermittent step rotation of the sprocket 17 draws the strip 3a forward the distance between two adjacent blank spaces (Fig. 5) in a single row, this also being the distance between adjacent perforations b, c, and d in their respective rows. During the rest period the perforating punch mechanism A in an operating stroke cuts through the strip 3a and forms one perforation b, one c and one d in each of the three rows.

The perforated strip 3a it will be recalled is on edge, that is, in a substantially vertical plane and upon leaving the sprocket 17 and roller 19, the strip passes into a loop j (Fig. 1). This loop may be supported by a disc 20 arranged at a convenient position to allow free play of the stock as it is being fed. At the other side, the loop j passes between idle rollers 21 mounted upon vertical shafts 22. These rollers guide the perforated strip 3a into a proper position for entrance into the first of the blank cutting press mechanisms, this first blank cutting machine being designated by the letter B (Figs 1 and 3). Feeding of the strip will be described later.

The press mechanism B comprises a reciprocating punch member 23 and a stationary die support 24 of conventional press construction. Die support 24 carries a first blanking die unit C, a second blanking die unit D and a scrap trimming die unit E. The punch member 23 carries three punch units F, G and H which cooperate respectively with the die units C, D and E.

The blanking punch unit F cooperating with the die unit C strikes out a blank k (Fig. 5) from the lower row of double blank spaces g. Fig 9 shows these cooperating die units C and F in detail. The blanking of a can end is usually accompanied by a can end forming operation in the same set of dies. Since this is standard practice such a conventional die unit is here shown and will be briefly described.

The stationary die unit C includes a cutting die with a cutting edge 25 which is mounted upon and bolted to the die support 24. The blanking punch unit F which has movement with the reciprocating punch member 23 includes a punch element 26 which cooperates with the die 25 to first blank the can end from the strip of stock. Punch 26 continuing its movement presses the edge of the cut out blank against a draw ring 27 which is mounted in the conventional manner upon pins which lead to the standard rubber or spring unit which provides a yielding die element.

The punch unit F also carries a punch center 28. A movable knockout ring 29 is mounted between the punch 26 and the punch center. This acts as a knockout after the formation of the can end for removing the end from the die, this being a common press feature. The die support 24 also carries a panel forming die center 30 which cooperates with the punch center 28. A hold down ring 31 is carried by the movable punch 26 and cooperates with the die and punch parts carried by the stationary die support 24 in the conventional manner.

The second punch unit G also carried by the punch member 23 is identical in construction to the punch unit F. The die unit D is identical in construction to the die unit C. These parts cooperate in the conventional manner for cutting out a second can end. This second can end is identical in shape and size to the first cut can end. The second can end is cut from the upper row of the double row g, this blank position being designated by the letter l, in Fig. 5. It will be observed that the blanks k and l are spaced apart further than adjacent blank distances. This is done to allow room for the necessary die parts just described. The die parts D and G being of the same construction as the die parts C and F further detailed description is not needed as Fig. 9 also fully discloses the details of such later die mechanism.

The scrap trimming punch unit H is the third punch device carried by the punch member 23 and as already described cooperates with the scrap unit E mounted on the die support 24. Punch unit H (Fig. 10) includes one or more trimming punches 35. Die unit E includes one or more cooperating cutting edges 36 which are mounted on the die support 24. When the punch member 23 moves in on its operating stroke each trimming punch 35 passes into associated die part 36 for the trimming operation.

These die parts sever scrap produced by the can end blanking and forming operations such scrap being in the two rows of blank spaces in the bottom double row g of the strip. Severing takes place across the skeleton stock at the places indicated in Fig. 5 by the letters m, n and o. It will be observed that by means of these three cuts the forward end of the scrap is cut off and falls away from the double row of the strip.

The same type of sprocket feed is used in drawing the strip into and through the press mechanism B as is used for drawing the strip through the perforating press A. This has been fully described in connection with the former sprocket 17, as shown in detail in Fig. 8. Accordingly, it is sufficient to state that the strip is drawn forward through the press mechanism B by a sprocket 41 (Fig. 1) mounted on a vertical shaft 42. A grooved pressure roller 43 mounted on a vertical shaft 44 keeps the strip in proper engagement with the sprocket 41.

By the time the strip reaches the sprocket 41 and roller 42, it has been partly cut away, as already described, but all the rows of perforations $b$, $c$ and $d$ still remain as will be seen in Fig. 5. The strip, however, is narrower and this narrowed strip now will be designated as $2a$, see also Fig. 3. Leaving the sprocket 41 strip $2a$ passes into a loop $p$ (Fig. 1). On the opposite side the loop $p$ passes through idle rollers 45. These rollers may be mounted upon vertically disposed shafts 46. The loop $p$ is supported on a disc 47 arranged at a convenient position to allow free play of the stock as it is being fed.

Idle rollers 45 direct the strip $2a$ into proper position for entrance into a second blank cutting press mechanism J. The strip from this position is drawn forward (Fig. 2) intermittently by a sprocket 51 mounted upon a vertically disposed intermittently rotatable shaft 52. A grooved pressure roller 53 keeps the strip in proper engagement with the sprocket, the pressure roller being mounted upon a vertically disposed shaft 54.

Both sprocket 51 and roller 53 are similar in construction to the sprocket 17 and roller 19, as already fully described in connection with Fig. 8. There is this difference, however, sprocket 51 and roller 53 are narrower in vertical dimension than the corresponding sprocket 17 and roller 19 as the strip, in passing through the press mechanism J, is further reduced in width. This narrowed strip will now be referred to by the letter $a$. Strip $a$ has only the single double row $i$ of blank spaces (Figs. 4 and 6) but two rows of perforations $c$ and $d$ remain for engagement in the teeth of the sprocket 51. This blanking and scrap trimming will now be described.

The second press mechanism J comprises a reciprocating punch member 61 (Fig. 2) and a stationary die support 62 between which the strip passes. The die support 62 carries a first blanking die unit K, a second blanking die unit L and a scrap trimming die unit M. The punch member 61 carries a blanking punch unit N which has cooperation with the die unit K. A second blanking punch unit O is also carried by the punch member and has cooperation with the die unit L. The third element carried by the punch member 61 is a scrap trimming punch P which cooperates with the scrap trimming unit M.

The punch and die blanking parts K, N and L, O are the same as the corresponding parts in the press mechanism B already described in connection with Fig. 9. The punch and die scrap trimming parts M and P are the same as the corresponding parts in press mechanism B already described in connection with Fig. 10.

Thus, the units K and N remove one of the double blanks from the double blank row $h$ (Fig. 6) of strip $2a$, the blank coming out of the upper row as at $q$. In like manner the units L and O remove a second blank $r$ from the adjacent or lower row of the double blank row $h$. The scrap punching die units P and M cut off portions from the remaining skeleton or scrap produced by removal of the blanks $q$ and $r$, this severing taking place at the points $s$, $t$ and $u$, see Fig. 6.

Thus it will be observed that this removal of scrap completely cuts away the intermediate or second double row $h$ from the strip $2a$ transforming it into the narrower strip $a$ (Fig. 4) already briefly mentioned. It will be evident now why the sprocket 51 operates only on the remaining two rows of perforations $c$ and $d$ since the lower row of perforations $b$ was cut away during the scrap severing at the positions $s$, $t$ and $u$.

Strip $a$ upon leaving the sprocket 51 (Fig. 2) and roller 53 passes into a lop $jj$. This loop may be supported by a disc 65 arranged at a convenient position to allow free play of the stock as it is being fed. The loop $jj$ as well as the other loops $j$ and $p$ are utilized in synchronization of operations between the various machines in the can manufacturing line. They permit more accurate operation control by interconnected switches, electrical circuits or the like but such line control forms no part of the present invention and further discussion is believed unnecessary.

At the other side of the loop $jj$ passes into a sprocket 66 mounted on a vertical shaft 67. A grooved pressure roller 68 mounted on vertical shaft 69 keeps the strip in proper engagement with the sprocket. These sprocket and roller parts are the same as the corresponding parts 17 and 19 already described in connection with Fig. 8.

The sprocket 66 (Fig. 2) and roller 68 feed the strip $a$ containing its double row $i$ of blank spaces into a third press mechanism R. In this feeding action the strip perforations $c$ and $d$ are used with sprocket 66 as with the immediately preceding sprocket 51. The sprocket feed 66 differs from feeding of strip stock through the press mechanism A, B and J in one minor respect. The strip now is pushed forward instead of being drawn forward. The reason for this is obvious when it is recalled that the strip $a$ ceases to exist as a strip while it is still being operated on in the press mechanism R.

The mechanism R comprises a reciprocating punch member 71 and a stationary die support 72. The die support 72 carries a first blanking die unit S, a second blanking die unit T and a scrap trimming die unit U. The punch member 71 carries a first blanking punch unit V having cooperation with the die unit S, a second blanking punch unit W having cooperation with the second blanking die unit T and a scrap trimming punch unit X which cooperates with the scrap trimming die unit U.

The blanking units S, V and T, W are identical in construction and operation with those in the press mechanism B fully described in connection with Fig. 9 of the drawings. The scrap trimming units are the same as in the press mechanism B described in connection with Fig. 10.

The first blanking punch and die units S and V remove one of the double blanks from the double blank row $i$ in the strip $a$ as shown at $v$ in Fig. 6. In like manner the second blanking punch and die parts W and T remove a second blank $w$ from the lower row of the double blank row $i$. The scrap punch and die parts X and U sever the skeleton or scrap produced by removal of the blanks $v$ and $w$ and this takes place at the point $x$, $y$ and $z$ in Fig. 6.

It will be observed that this removal of scrap completely cuts away what remains of the narrow strip $a$. In this manner the blank cutting and scrap trimming operations progress from strip $3a$ to strip $2a$ and thence from strip 2a to strip a, the last of the operations, the trimming operation, removing all of the final strip a. The required number of blanks, which in this embodiment are can ends, thus is easily obtained in a practically uninterrupted manner and there are no scrap handling problems requiring attention at the end of the can manufacturing line as is usual in most methods of blank cutting.

From what has just been described it will be evident that the same steps of feeding, gauging and cutting will be performed on the modified layout of Figs. 11 and 12. The same three rows of perforations b, c and d in this layout are disposed in the strip 3a in substantially the same positions. Instead of a bottom double row g of blank spaces e there will be a single row of blank spaces. In like manner the intermediate row h and the top row i instead of being double rows of blank spaces e will be single rows. Furthermore there will not be any stagger arrangement although a stagger arrangement could be used on the single row layout as between rows. The scrap cutting also will be simplified when only single rows are used.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of cutting blanks from a strip of sheet material containing a plurality of parallel rows of potential blank spaces, which consists in providing a pair of rows of spaced gauging and feeding perforations disposed adjacent to and parallel with a row of said blank spaces, feeding the perforated strip longitudinally of said rows of perforations by engagement therein, and successively cutting blanks from the blank spaces in the different rows while reserving for final cutting the row of blank spaces adjacent the perforations, thereby insuring maintenance of perforations adjacent a rigid uncut portion of the strip for its complete feeding and gauging and until the last potential blank is removed from the strip.

2. The method of cutting blanks from a strip of sheet material containing a plurality of parallel rows of potential blank spaces, which consists in providing a plurality of rows of spaced gauging and feeding perforations having a pair of rows disposed adjacent to and parallel with a final row of said blank spaces, feeding the perforated strip longitudinally of said rows of perforations and through a plurality of working stations by engagement within said perforations, cutting blanks from one row of blank spaces at one of said stations, cutting blanks from other rows of blank spaces at other working stations, and finally cutting blanks at the last station from the said final row of blanks having the said adjacent pair of rows of said perforations.

3. The method of cutting blanks from a strip of sheet material containing a plurality of parallel rows of potential blank spaces, which consists in forming a row of spaced gauging and feeding perforations adjacent to and parallel with a row of said blank spaces, feeding the perforated strip intermittently and longitudinally of said rows of perforations by engagement within said perforations, cutting blanks from one row of said blank spaces while the strip is at rest leaving the remaining portion of the strip narrower by the width of the row of blank spaces so cut, successively cutting blanks from the remaining rows of blank spaces while still further narrowing the strip, and finally cutting the last remaining row of blank spaces while utilizing the last two rows of perforations for feeding the narrowed strip.

4. The method of cutting blanks from a strip of sheet material containing a plurality of parallel rows of potential blank spaces, which consists in forming a row of spaced gauging and feeding perforations adjacent to and parallel with a row of said blank spaces, feeding the perforated strip intermittently and longitudinally of said rows of perforations by engagement within said perforations, cutting blanks from one row of said blank spaces while the strip is at rest, severing the scrap created by the blank cutting thereby leaving the remaining portion of the strip narrower by the width of the row of blank spaces so cut, successively cutting blanks from the remaining rows of blank spaces and successively severing the scrap created at each cutting operation, and finally cutting the last remaining row of blank spaces while utilizing the last two rows of perforations for feeding the narrowed strip followed by a final severing of the scrap.

5. The method of cutting blanks from a strip of sheet material containing a plurality of parallel rows of potential blank spaces, which consists in maintaining the strip in vertical position throughout a plurality of feeding and cutting operations, forming a row of spaced gauging and feeding perforations adjacent to and parallel with the said rows of blank spaces, feeding the perforated strip intermittently and longitudinally of said rows of perforations and in vertical positions by engagement within said perforations, cutting blanks from one row of said blank spaces while the strip is at rest in its vertical position, severing the scrap created by the blank cutting, said scrap dropping from the vertical strip thereby leaving the remaining portion of the strip narrower by the width of the row of blank spaces so cut, successively cutting blanks from the remaining rows of blank spaces, successively severing the scrap created at each of these cutting operations, and finally cutting the last remaining row of blank spaces while utilizing the last two rows of perforations for feeding the narrowed strip in its vertical position followed by a final severing of the scrap.

6. The method of cutting a double row of blanks from a strip of sheet material containing a plurality of double parallel rows of potential blank spaces, which consists in perforating the strip to form at least a double parallel row of gauging and feeding perforations, advancing the perforated strip longitudinally of the row of said gauging and feeding perforations by engagement therewith, and simultaneously cutting double blanks from said advanced sheet metal with a blank in each row.

7. The method of cutting double rows of blanks from a strip of sheet material containing a plurality of double parallel rows of potential blank spaces with the blanks in one row staggered with respect to the blanks in an adjacent row, which consists in punching a plurality of rows of gauging and feeding perforations in the strip, intermittently advancing the perforated strip longitudinally by successive engagement in said gauging perforations, simultaneously cutting double blanks from each double row when said strip is at rest, and severing the scrap formed in each cutting operation from said strip.

8. The method of cutting a plurality of double rows of blanks from a strip of sheet material containing a multiple number of double row blanks with the blanks in one row staggered with respect to the blanks in an adjacent row, which consists in forming perforations in the strip arranged in predetermined rows and with an equal spacing between adjacent perforations in each row there being a row of perforations for each double row of blanks, cutting two blanks from the double row extending along one edge of the strip by removing one blank from each row of said double row, severing the scrap from said cut double row and leaving a strip narrower by approximately the width of the double row cut, repeating the blank cutting and the scrap severing operations successively on each next adjacent double row as long as the constantly narrowing strip is a double row in width, and intermittently advancing the strip between each cutting operation.

9. The method of cutting a plurality of double rows of circular blanks from sheet metal strips containing an even multiple of double row blanks with the blanks in one row staggered with respect to the blanks in an adjacent row, the strips having a plurality of rows of evenly spaced perforations, which consists in intermittently advancing a strip the distance between perforations in a row, cutting simultaneously two blanks from the double row extending along one edge of the strip by removing one blank from each row, severing the scrap from said cut double row thereby leaving a strip narrower by approximately the width of the double row cut, then simultaneously cutting two blanks from the next adjacent double row by removing one blank from each row, and severing the scrap from the double row just cut.

10. The method of cutting blanks from a strip of sheet material containing a plurality of parallel rows of potential blank spaces, which consists in providing a row of spaced gauging and feeding openings disposed adjacent to and parallel with a row of said blank spaces, feeding the strip longitudinally of said row of openings by engagement therein, and successively cutting blanks from the blank spaces in the different rows while reserving for final cutting a row of blank spaces adjacent said row of openings, thereby insuring maintenance of openings adjacent a rigid uncut portion of the strip for its complete feeding and gauging until the last potential blank is removed from the strip.

11. The method of cutting blanks from a strip of sheet material containing a plurality of parallel rows of potential blank spaces, which consists in forming a row of spaced gauging and feeding openings adjacent to and parallel with a row of said blank spaces, feeding the strip longitudinally of said row of openings by engagement within the openings, cutting blanks from one row of said blank spaces leaving the remaining portion of the strip narrower by the width of the row of blank spaces so cut and leaving the row of openings, successively cutting blanks from the remaining rows of blank spaces while still further narrowing the strip, and finally cutting the last remaining row of blank spaces while utilizing the row of openings for feeding the narrowed strip.

12. The method of cutting double rows of blanks from a strip of sheet material containing a plurality of double parallel rows of potential blank spaces with the blanks in one row staggered with respect to the blanks in an adjacent row, which consists in punching a row of gauging and feeding openings in the strip, advancing the strip longitudinally by successive engagement in said openings, simultaneously cutting double blanks from each double row, and severing the scrap formed in each cutting operation from said strip, and leaving the said row of openings in the strip until the last cutting operation.

JOHN E. SOCKE.

REFERENCES CITED

The following references are of record in the file of this patent:

UNITED STATES PATENTS

| Number | Name | Date |
|---|---|---|
| 1,481,332 | Stock | Jan. 22, 1924 |
| 1,725,944 | Thompson | Aug. 27, 1929 |
| 2,150,016 | Wood | Mar. 7, 1939 |